(12) United States Patent
Tzadok

(10) Patent No.: US 11,796,663 B2
(45) Date of Patent: Oct. 24, 2023

(54) AUTOMATIC IMAGE REJECTION CALIBRATION FOR RADAR SYSTEMS USING QUADRATURE TRANSCEIVERS

(71) Applicant: INTERNATIONAL BUSINESS MACHINES CORPORATION, Armonk, NY (US)

(72) Inventor: Asaf Tzadok, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 17/180,778

(22) Filed: Feb. 20, 2021

(65) Prior Publication Data

US 2022/0268914 A1    Aug. 25, 2022

(51) Int. Cl.
*G01S 13/34*    (2006.01)
*G01S 13/36*    (2006.01)
(Continued)

(52) U.S. Cl.
CPC .............. *G01S 13/34* (2013.01); *G01S 7/354* (2013.01); *G01S 7/40* (2013.01); *G01S 13/36* (2013.01); *G01S 7/356* (2021.05)

(58) Field of Classification Search
None
See application file for complete search history.

(56) References Cited

U.S. PATENT DOCUMENTS 7,403,153 B2    7/2008    Kelly, Jr.
7,656,342 B2    2/2010    Stolarczyk
(Continued)

FOREIGN PATENT DOCUMENTS

CN    202794515 U    3/2013
CN    108169736 A    6/2018
(Continued)

OTHER PUBLICATIONS

Ong, W. "Commercial Off The Shelf Direct Digital Synthesizers For Digital Array Radar"; Master's Thesis, Dec. 2005, Naval Postgraduate School, Monterey, CA 93943-5000; 82 pgs.
(Continued)

*Primary Examiner* — Timothy A Brainard
*Assistant Examiner* — Hailey R Le
(74) *Attorney, Agent, or Firm* — Intelletek Law Group, PLLC; Gabriel Daniel, Esq.

(57) ABSTRACT

A method of automatic image rejection and monitoring of a frequency modulated continuous-wave (FMCW) radar system, includes generating a quadrature FMCW signal comprising an in-phase signal and a quadrature signal by a dual output FMCW signal generator. The in-phase signal and the quadrature signal are transmitted. A radar signal comprising a response in-phase and a quadrature signal is received in response to the transmitted in-phase signal and the quadrature signal. The response in-phase signal and quadrature signals are provided to an analog to digital converter (ADC). An in-phase beat signal (Beat-I) and a quadrature beat signal (Beat-Q) are extracted from the ADC, based on a received windowing signal. A relative phase and/or amplitude adjustment is generated by providing a phase calibration variable $(\theta_t)$ and/or an amplitude calibration variable $(A_t)$ as input to the dual output FMCW signal generator, based on a correlation between the Beat-I and the Beat-Q.

20 Claims, 7 Drawing Sheets

(51) Int. Cl.
    *G01S 7/40*     (2006.01)
    *G01S 7/35*     (2006.01)

(56) References Cited

U.S. PATENT DOCUMENTS

| | | | |
|---|---|---|---|
| 7,659,847 B2 | 2/2010 | Bausov | |
| 7,773,205 B2 | 8/2010 | Cooper | |
| 7,982,661 B2 | 7/2011 | Beasley | |
| 8,686,898 B2 | 4/2014 | Beasley | |
| 8,711,905 B2 | 4/2014 | Kravilz | |
| 9,972,917 B2 | 5/2018 | Vacanti | |
| 2016/0054395 A1* | 2/2016 | Bell | H02J 50/20 |
| | | | 324/764.01 |
| 2017/0012631 A1 | 1/2017 | Dato | |
| 2017/0285140 A1* | 10/2017 | Gupta | H03D 3/009 |
| 2017/0343667 A1* | 11/2017 | Vacanti | G01S 7/032 |
| 2018/0252798 A1 | 9/2018 | Bilik et al. | |
| 2018/0321358 A1 | 11/2018 | Carswell | |
| 2019/0018127 A1 | 1/2019 | Guarin Aristizabal et al. | |
| 2020/0333452 A1 | 10/2020 | Vacanti | |
| 2021/0226641 A1* | 7/2021 | Hyman | H03L 7/0816 |
| 2021/0367687 A1* | 11/2021 | Nayebi | H04B 15/00 |

FOREIGN PATENT DOCUMENTS

| | | |
|---|---|---|
| CN | 108777671 A | 11/2018 |
| CN | 109154645 A | 1/2019 |
| CN | 112051555 A | 12/2020 |
| JP | 3930376 B2 | 3/2007 |
| KR | 101008573 B1 | 1/2011 |
| WO | 2020016877 W | 1/2020 |

OTHER PUBLICATIONS

Peek, K. "An Analysis of the Effects of Digital Phase Errors on the Performance of a FMCW—Doppler Radar"; thesis, Sep. 2011, The University of Twente, Enschede, Netherlands; 101 pgs.

Plata, S., "FMCW Radar Transmitter Based on DDS Synthesis"; 2006 International Conference on Microwaves, Radar & Wireless Communications, Krakow, 2006, pp. 1179-1183, doi: 10.1109/MIKON.2006.4345398.

Yu, J. et al., "A single-chip x-band chirp radar MMIC with stretch processing"; Proceedings of the IEEE 2012 Custom Integrated Circuits Conference, San Jose, CA, 2012, pp. 1-4, doi: 10.1109/CICC.2012.6330617.

International Search Report and Written Opinion dated Jun. 6, 2022 in related international patent application No. PCT/IB2022/051420, 11 pgs.

\* cited by examiner

AUTOMATIC IMAGE REJECTION CALIBRATION FOR RADAR SYSTEMS USING QUADRATURE TRANSCEIVERS

BACKGROUND

Technical Field

The present disclosure generally relates to radar systems, and more particularly, to systems and methods of calibrating quadrature imbalances in Frequency-Modulated Continuous Wave radar systems.

Description of the Related Art

Frequency-Modulated Continuous Wave (FMCW) radar relates to radar systems that radiate continuous transmission power and can change its operating frequency during a measurement by modulating its transmission signal in frequency and/or in phase. Typical FMCW radar systems are not used for wireless communications. In contrast, FMCW radar systems that use a quadrature transmitter TX and/or transceiver TRX can be configured to be used for wireless communication. Such systems often transmit data using a baseband interface with two ports: an in-phase (I) and quadrature (Q), these two signals are being mixed using an up-conversion mixer using with a high frequency signal and its quadrature, accordingly, to transform the base frequency signal to a much higher frequency. The combined output is then transmitted by an antenna. An opposite process is performed in the receive side, where a down-conversion mixer provides generates an I and Q outputs. An IQ quadrature transceiver includes, for each transmitter (TX) or receiver (RX) separate paths for the I-channel and the Q-channel.

In order to use an IQ transceiver for FMCW radar, the baseband IQ signals are phased-shifted relative to each other by 90 degrees, sometimes referred to as a quadrature relationship. This has two main benefits: (i) cutting the bandwidth needed by half, and (ii) avoiding signal modulation due to a rotation of IQ on a receive side.

SUMMARY

According to one embodiment, a frequency modulated continuous-wave (FMCW) radar system includes a quadrature transceiver comprising a transmitter having an in-phase input and a quadrature input and a receiver having an in-phase output and a quadrature output. A dual channel FMCW signal generator includes a first output coupled to the in-phase input of the transmitter, and a second output coupled to the quadrature input of the transmitter. A first splitter is coupled between the first output of the dual channel FMCW signal generator and the in-phase input of the transmitter. A second splitter is coupled between the second output of the dual channel FMCW signal generator and the quadrature input of the transmitter. A first mixer includes a first input coupled to a second output of the first splitter; a second input coupled to the in-phase output of the receiver; and an output. A second mixer includes a first input coupled to a second output of the second splitter; a second input coupled to the quadrature output of the receiver; and an output. A dual channel analog to digital converter (ADC) includes a first input coupled to the output of the first mixer, and a second input coupled to the output of the second mixer. A controller is coupled between the programmable dual channel FMCW signal generator and the dual channel ADC.

In one embodiment, the dual channel FMCW signal generator is programmable.

In one embodiment, the dual channel FMCW is configured to provide a windowing signal that indicates a start and an end of each frequency ramp cycle.

In one embodiment, the first and second power splitters are two-way power splitters.

In one embodiment, the controller includes a quadrature calibration block that is configured to receive an in-phase beat signal from a first output of the dual channel ADC and a quadrature beat signal from a second output of the dual channel ADC.

In one embodiment, there is a low pass filter at each input channel of the dual channel ADC.

In one embodiment, the controller further comprises a Fast Fourier Transform (FFT) block configured to receive the in-phase beat signal and the quadrature beat signal from the second output of the dual channel ADC and to provide a radar output. In one embodiment, pre or post FFT averaging of the Beat-I and Beat-Q signals can be used to improve the signal to noise ratio (SNR). In this way, the signal to noise ratio of the radar output is improved.

In one embodiment, the quadrature calibration block is configured to provide at least one of a phase calibration variable ($\theta t$) or an amplitude calibration variable ($A_t$) as input to the dual output FMCW signal generator.

In one embodiment, the dual channel FMCW signal generator is a digital circuit block.

In one embodiment, the controller is configured to select initial quadrature calibration variables ($\theta_t, A_t$). The initial quadrature calibration variables ($\theta_t, A_t$) are applied as input to the dual output FMCW signal generator. An in-phase beat signal from a first output of the dual channel ADC and a quadrature beat signal from a second output of the dual channel ADC are received, based on the applied initial quadrature calibration variables ($\theta_t, A_t$). The in-phase beat signal is correlated with the quadrature beat signal. Upon determining that the correlation is below a predetermined threshold, new quadrature calibration variables ($\theta_t, A_t$) are selected.

According to one embodiment, a method of automatic image rejection of a frequency modulated continuous-wave (FMCW) radar system includes generating a quadrature FMCW signal comprising an in-phase signal and a quadrature signal by a dual output FMCW signal generator. The in-phase signal and the quadrature signal are transmitted by way of a transmitter of a transceiver. A radar signal comprising a response in-phase signal and a response quadrature signal are received in response to the transmitted in-phase signal and the quadrature signal of the transceiver. The response in-phase signal and the response quadrature signal are provided to a dual channel analog to digital converter (ADC). A controller receives a windowing signal that indicates a start and an end of a frequency ramp cycle of the generated quadrature FMCW signal. The controller extracts an in-phase beat signal (Beat-I) and a quadrature beat signal (Beat-Q) from the dual channel ADC, based on a received windowing signal. The controller correlates between the Beat-I and the Beat-Q. The controller generates a relative phase and/or amplitude adjustment by providing a phase calibration variable ($\theta_t$) and/or an amplitude calibration variable ($A_t$) as input to the dual output FMCW signal generator, based on the correlation.

In one embodiment, upon determining that a threshold correlation is not achieved, the phase calibration variable ($\theta_t$) and/or the amplitude calibration variable ($A_t$) is iteratively adjusted and provided as input to the dual output FMCW signal generator, until the threshold correlation is achieved.

In one embodiment, low pass filtering is performed at each input channel of the dual channel ADC.

In one embodiment, the in-phase signal of the FMCW signal is split by a first power splitter into a first in-phase signal of the FMCW signal that is provided to the transmitter and a second in-phase signal of the FMCW signal as a first in-phase input to a first mixer. The quadrature signal of the FMCW signal is split by a second power splitter into a first quadrature signal of the FMCW signal that is provided to the transmitter and a second quadrature signal of the FMCW signal as a first quadrature input to a second mixer.

In one embodiment, the first mixer mixes the first in-phase input with an in-phase radar signal received by the receiver and provides a result as a first input to a dual channel analog to digital converter (ADC). The second mixer mixes the first quadrature input with a quadrature radar signal received by the receiver and provides a result as a second input to the dual channel ADC.

In one embodiment, at least one of a direction of the transmitter or the receiver is adjusted to increase a leakage current or amount of signal reflection to enhance a calibration capability of the FMCW radar system.

According to one embodiment, a method of calibrating a frequency modulated continuous-wave (FMCW) radar system includes providing a quadrature transceiver comprising a transmitter having an in-phase input and a quadrature input, and a receiver having an in-phase output and a quadrature output. A dual channel FMCW signal generator is provided comprising a first output coupled to the in-phase input of the transmitter, and a second output coupled to the quadrature input of the transmitter. A first splitter is coupled between the first output of the dual channel FMCW signal generator and the in-phase input of the transmitter. A second splitter is coupled between the second output of the dual channel FMCW signal generator and the quadrature input of the transmitter. A first mixer provided comprising a first input coupled to a second output of the first splitter, a second input coupled to the in-phase output of the receiver, and an output. A second mixer is provided comprising a first input coupled to a second output of the second splitter, a second input coupled to the quadrature output of the receiver and an output. A dual channel analog to digital converter (ADC) is provided comprising a first input coupled to the output of the first mixer, and a second input coupled to the output of the second mixer. A controller is coupled between the programmable dual channel FMCW signal generator and the dual channel ADC.

In one embodiment, the dual channel FMCW signal generator receives a phase calibration variable ($\theta_t$) and/or an amplitude calibration variable ($A_t$). The dual channel FMCW signal generator is programmed based on the received phase calibration variable ($\theta_t$) and/or the amplitude calibration variable ($A_t$).

In one embodiment, a windowing signal is provided by the dual channel FMCW signal generator, which indicates a start and an end of each frequency ramp cycle of the dual channel FMCW signal generator.

In one embodiment, a quadrature calibration block of the controller receives an in-phase beat signal from a first output of the dual channel ADC and a quadrature beat signal from a second output of the dual channel ADC.

In one embodiment, each input channel of the dual channel ADC is low pass filtered.

In one embodiment, a Fast Fourier Transform (FFT) block of the controller receives the quadrature beat signal from the second output of the dual channel ADC and provides a radar output based on the quadrature beat signal.

In one embodiment, at least one of a phase calibration variable ($\theta_t$) or an amplitude calibration variable ($A_t$) is provided as input to the dual output FMCW signal generator, by the quadrature calibration block of the controller.

In one embodiment, the FMCW signal generator is operated in a digital realm.

In one embodiment, the controller selects initial quadrature calibration variables ($\theta_t$, $A_t$). The controller applies the initial quadrature calibration variables ($\theta_t$, $A_t$) as input to the dual output FMCW signal generator. The controller receives an in-phase beat signal from a first output of the dual channel ADC and a quadrature beat signal from a second output of the dual channel ADC based on the applied initial quadrature calibration variables ($\theta_t$, $A_t$). The controller correlates the in-phase beat signal with the quadrature beat signal. Upon determining that the correlation is below a predetermined threshold, the controller selects new quadrature calibration variables ($\theta t$, $At$) to be applied to the dual output FMCW signal generator.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
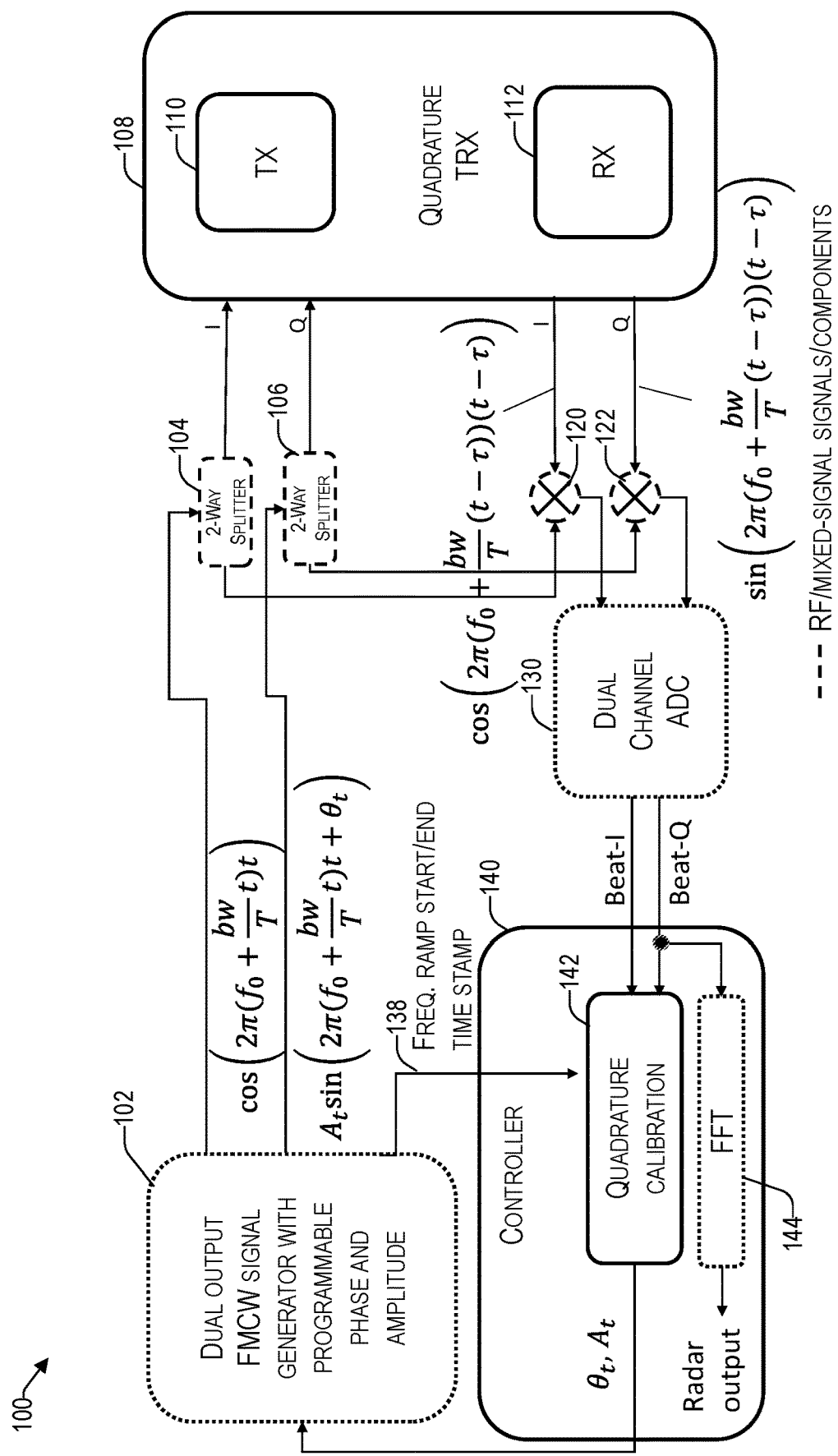
FIG. 1 is a block diagram of an architecture of a calibration of an in-phase and quadrature path imbalance for a frequency modulated continuous-wave radar system using a quadrature transceiver, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to radar systems, and more particularly, to systems and methods of calibrating quadrature imbalances in Frequency-Modulated Continuous Wave radar systems.

Quadrature imbalance in the transmitter or receiver can weaken the ability to successfully transmit and/or receive high speed data carried by the wireless signal. For example, quadrature imbalance may occur when the phase relationship between the I and Q channels is not exactly 90 degrees and/or the amplitude of the I channel is different from that of the Q channel. Accordingly, quadrature imbalance can be caused by gain and/or phase mismatches of the high frequency components in the I and Q channels of an FMCW radar system. For example, the receiver components in the I channel can have slightly different phase and/or amplitude than the receiver components in the Q channel, thereby introducing imbalance or mismatch errors in the I and Q baseband signals. Although the differences are usually small, these gain and phase imbalances reduce the quality of the FMCW radar system, double the bandwidth, and can increase the number of bit errors for a given data rate.

Known FMCW radar systems that use a quadrature architecture typically involve a generation of a frequency ramp in quadrature using a dual channel Direct Digital Synthesizer (DDS) with up to 500M samples per second, allowing a narrower 200 MHz bandwidth. Further, known architectures typically involve a large bandwidth and are costly to implement, often involving a field programmable gate array (FPGA) that feeds a dual channel Digital to Analog Converter (ADC), or application specific integrated circuit (ASIC) to feed two streams of data, and result in high power consumption. However, such systems typically only focus on providing a good dual channel FMCW in quadrature, but do not provide automatic image rejection calibration and monitoring. Poor image rejection results in transmission of signal at image frequencies, which ultimately result in radar response modulation.

The teachings herein are able to accommodate quadrature imbalance in the receiver and/or transmitter, which can facilitate transmission and receipt of high-speed data carried by the wireless radar signal. Gain and/or undesired phase mismatches between the in-phase and quadrature paths are systematically removed by way of an image rejection calibration. A quadrature FMCW signal is generated. Two radar readings are received from a dual channel analog to digital converter (ADC). A windowing signal is used to extract an in-phase beat signal and a quadrature beat signal, sometimes referred to herein as Beat-I and Beat-Q. A correlation between the two channels is performed and iteratively repeated until the correlation between the Beat-I and Beat-Q signals is within a predetermined threshold or a maximum correlation is achieved. By virtue of concepts discussed herein continuous validation and tracking on the image rejection performance is provided. A wired loop between the transmitter and the receiver, or external measurement equipment is not required. The features of the present application will be better understood in view of FIGS. 1 to 4, which are discussed in detail below.

Example Architecture

FIG. 1 is a block diagram of an architecture 100 of a calibration of an in-phase and quadrature path imbalance for a frequency modulated continuous-wave (FMCW) radar system using a quadrature transceiver, consistent with an illustrative embodiment. Architecture 100 includes a transceiver 108 having an in-phase input "I" and a quadrature input "Q," which are provided to a transmitter (TX) 110 of the quadrature transceiver 108. The quadrature transceiver 108 has a receiver (RX) 112 having an in-phase output "I" and a quadrature output "Q." In various embodiments, the transceiver can support various communication protocols that use OFDM signals, including, without limitation, 802.11a/g/n (WiFi), 802.16d/e/m (WiMAX), and 3GPP Rel. 8/9 (LTE).

There is a dual channel FMCW signal generator 102 having a first output coupled to the in-phase input I of the transmitter 110 and a second output coupled to the quadrature input Q of the transmitter 110. The dual channel FMCW signal generator 102 is programmable in phase and amplitude based on input calibration signals of phase and amplitude ($\theta_t$, $A_t$) received from the controller 140, discussed in more detail later. The dual channel FMCW signal generator 102 is configured to provide a windowing signal that indicates a start and an end of each frequency ramp cycle 138 to the controller 140. For simplicity and to avoid clutter, various elements of the transmitter have been omitted, such as, multiplexers, power sources, local oscillators, digital signal processing (DSP) elements, etc.

By virtue of being generated in the digital realm, the frequency ramp 138 generated by the dual output FMCW signal generator 102 is digitally timed and synchronized using a common clock running at 3.5 GHz and any relative shift between them, due to line delay and internal buffer, is fixed and therefore consistent and accurate. For such ramp generation is not subject to process variations, temperature of operation, etc., typically experienced by analog circuit blocks.

The output of the dual output FMCW signal generator is an in-phase signal and a quadrature signal (TX IQ FMCW), represented by equations 1 and 2 below:

$$\text{In Phase} \rightarrow \cos\left(2\pi\left(f_0 + \frac{bw}{T}t\right)t\right) \quad \text{(Eq. 1)}$$

$$\text{Quadrature} \rightarrow \sin\left(2\pi\left(f_0 + \frac{bw}{T}t\right)t\right) \quad \text{(Eq. 2)}$$

Where
$f_0$ is the start frequency;
T is the period;
bw is the bandwidth; and
t is the time from when ramp starts, values between 0 to T . . .

As mentioned previously, the dual output FMCW signal generator 102 is programmable, which allows the in-phase and/or quadrature path to be adjusted. For example, equation 3 below provides a quadrature path that can be adjusted based on calibration variables ($\theta_t$, $A_t$).

$$\text{Quadrature} \rightarrow A_t \sin\left(2\pi\left(f_0 + \frac{bw}{T}t\right)t + \theta_t\right) \quad \text{(Eq. 3)}$$

As illustrated in equation 3 above, the quadrature path has a phase calibration variable $\theta_t$ and an amplitude calibration variable $A_t$, which allow adjustment of the quadrature (and/or in-phase) signal that is provided to the transmitter 110 of the transceiver 108. As used herein, for simplicity, the parameter $A_r$ represents a relative amplitude with respect to the quadrature path and the in-phase path. These calibration variables are provided by the controller 140 as calibration signals, as will be discussed in more detail below.

There is a first power splitter 104 coupled between the first output of the dual channel FMCW signal generator 102 and the in-phase input I of the transmitter 110. There is a second power splitter 106 coupled between the second output of the dual channel FMCW signal generator 102 and the quadrature Q input of the transmitter 110. The first and second power splitters 104 and 106 are two-way power splitters in that they each split the signal received from an output of the dual channel FMCW signal generator 102 and divide it between the transmitter and a corresponding mixer 120 or 122, respectively, in the receiver RX 112 feedback path, discussed in more detail below.

For example, the first splitter 104 is configured to receive the in-phase signal from the dual output FMCW signal generator 102 and split it into two separate paths, one leading to an in-phase input I of the transmitter 110 of the quadrature transceiver 108, and the second to the first mixer 120. The output of the receiver 112 (i.e., RX IQ FMCW) when the image rejection is near perfect for the in-phase output and the quadrature output of the receiver 112 is provided by equations 4 and 5, respectively:

$$\text{In Phase} \rightarrow \cos\left(2\pi\left(f_0 + \frac{bw}{T}(t-\tau)\right)(t-\tau)\right) \quad \text{(Eq. 4)}$$

$$\text{Quadrature} \rightarrow \sin\left(2\pi\left(f_0 + \frac{bw}{T}(t-\tau)\right)(t-\tau)\right) \quad \text{(Eq. 5)}$$

Equations 4 and 5 above represent the RX IQ FMCW when image rejection is near perfect. By way of example only and not by way of limitation, a 1.4 GHz bandwidth using a 3.5GSPS Direct Digital Synthesizer (DDS) can be used as part of the dual output FMCW signal generator 102. In one embodiment, two DDS are used for the dual output FMCW signal generator 102.

The first mixer 120 has a first input coupled to a second output of the first two-way splitter 104. There is a second input coupled to the in-phase output I of the receiver 112. Similarly, the second mixer 122 includes a first input coupled to a second output of the second two-way splitter 106 and a second input coupled to the quadrature output Q of the receiver 112. Each of the first and second mixers 120 and 122 provide an output that is provided to a dual channel analog to digital converter 130.

The first mixer 120 mixes the split in-phase signal received from the first splitter 104 with the in-phase output I of the receiver 112. Similarly, the second mixer 122 mixes the split quadrature signal from the second splitter 106 with the quadrature output Q of the receiver 112. The output of both mixers 120 and 122 is provided to a dual channel analog to digital converter 130 that is configured to provide an in-phase beat signal (sometimes referred to herein as Beat-I) and a quadrature signal (sometimes referred to herein as Beat-Q). The dual channel analog to digital converter 130 includes a first input coupled to the output of the first mixer 120 and a second input coupled to the output of the second mixer 122. The Dual channel ADC receives the signals from the mixers 120 and 122 and provides a corresponding in-phase and quadrature output signals, sometimes referred to herein as Beat-I and Beat-Q. It should be noted that, in one embodiment, a same relatively slow ADC (e.g., 10KSPS-10MSPS) that is used for a typical radar pipeline, is supported by the teachings herein, thereby reducing design complexity and cost. In some embodiments, there is a low pass filter (not shown) at each input of the dual channel ADC 130. Equations 6 and 7 provide the Beat IQ FMCW signals, respectively, without filtration.

$$\cos \alpha^* \cos \beta = 1/2(\cos(\alpha-\beta)+\cos(\alpha+\beta)) \quad \text{(Eq. 6)}$$

$$\sin \alpha^* \sin \beta = 1/2(\cos(\alpha-\beta)+\cos(\alpha+\beta)) \quad \text{(Eq. 7)}$$

When applying low pass filtration (LPF) at the output of the dual channel ADC 130, the following expressions are obtained:

$$\cos \alpha^* \cos \beta = 1/2(\cos(\alpha-\beta)) \quad \text{(Eq. 8)}$$

$$\sin \alpha^* \sin \beta = 1/2(\cos(\alpha-\beta)) \quad \text{(Eq. 9)}$$

In one example, the bandwidth that is provided at the output of the dual channel ADC 130 is 100 KHz to 2 MHz. By virtue of having such a relatively low frequency, a less complex and lower cost ADC 130 can be used.

The architecture includes a controller 140 coupled between the dual channel FMCW signal generator 102 and the dual channel ADC 130. In one embodiment, the controller 140 includes a quadrature calibration block 142 that is configured to receive the in-phase beat signal (Beat-I) from a first output of the dual channel ADC and a quadrature beat signal (Beat-Q) from a second output of the dual channel ADC 130. The controller 140 further includes a Fast Fourier Transform (FFT) block 144 configured to receive the quadrature beat signal from the second output of the dual channel ADC and to provide a radar output. The FFT block 144 is a practical use of FMCW processing pipeline, which allows the system to detect reflection from various distances. Each single tone represents a response from a corresponding distance. Every bin step is equivalent to the range resolution, which is dictated by the bandwidth. The quadrature calibration block 142 provides calibration signals of phase and amplitude ($\theta_r$, $A_r$) as an input to the dual channel FMCW signal generator 102.

Example Quadrature Calibration

Figure 2:
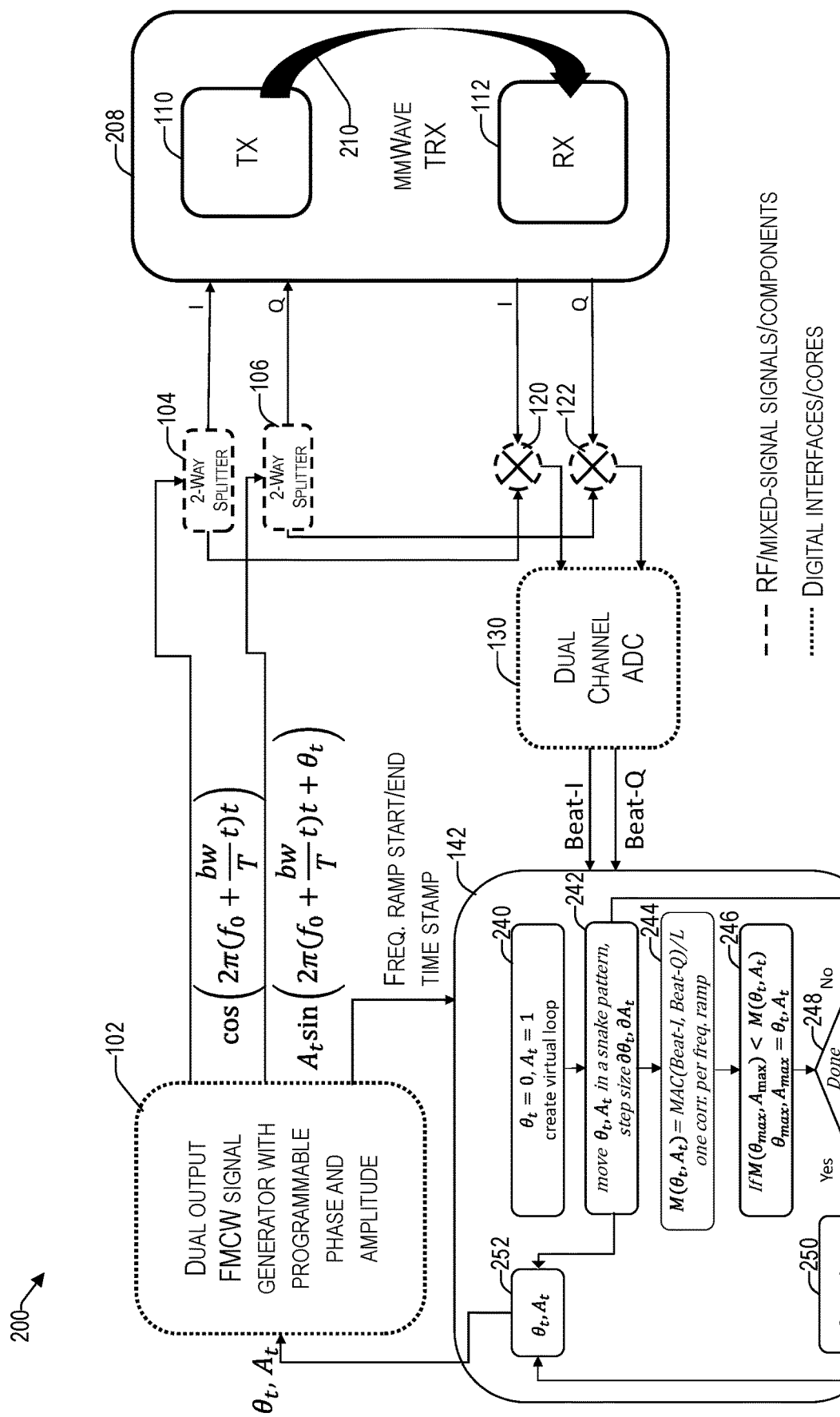
FIG. 2 is a conceptual block diagram of a calibration of an in-phase and quadrature imbalance for an FMCW radar system, consistent with an illustrative embodiment.

Reference now is made to FIG. 2, which provides a conceptual block diagram 200 of a calibration of an in-phase and quadrature imbalance for an FMCW radar system, consistent with an illustrative embodiment. Many of the blocks are repeated here from FIG. 1 for perspective and therefore not repeated here for brevity. Additional detail is provided in reference to the quadrature calibration block 142 of the controller 140 that was mentioned previously in the context of the discussion of FIG. 1.

At block 240 of the quadrature calibration block 142, a table having a predetermined path for calibration of the phase and calibration variables $\theta_r$ and $A_r$, is provided. In various embodiments, different techniques can be used to provide the calibration values for $\theta_r$ and $A_r$. By way of non-limiting example, a brute force approach may be used by filling a table and choosing the option with the highest correlation value; a coarse to fine approach may be used by starting with a coarse estimate (e.g., bigger steps) and zooming in to regions with higher potential; a memory could be used to store previous values and refine around them to support PVT variation, etc.

Figure 3:
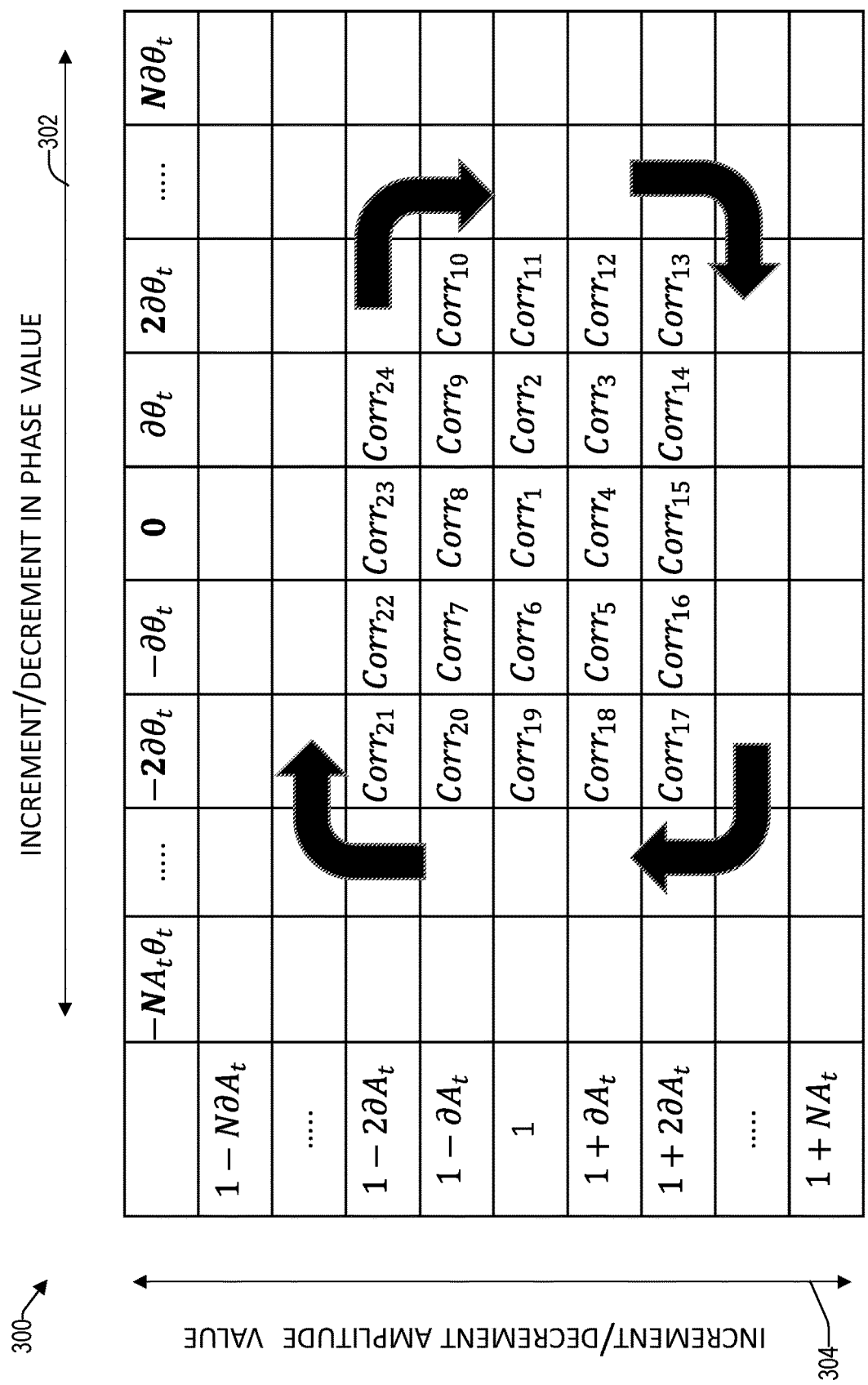
FIG. 3 provides an example table for a path to be used for the phase and amplitude calibration variables $\theta_t$ and $A_t$ pattern, consistent with an illustrative embodiment.

Reference is made to FIG. 3, which provides an example table 300 for a path to be used for the calibration values $\theta_r$ and $A_r$, sometimes referred to herein as a virtual loop or a snake pattern, consistent with an illustrative embodiment. It will be understood that table 300 is provided herein by way of example only, and not by way of limitation, as other ways of generating the calibration variables $\theta_t$ and $A_t$ are supported by the teachings herein as well.

Different values of $\theta_t$ and $A_t$ can be iteratively applied from the table 300 until a threshold calibration is achieved. The horizontal axis 302 represents an increment/decrement in phase value $\theta_t$, whereas the vertical axis 304 represents an increment/decrement of amplitude value $A_t$. For example, the initial calibration variables may be based on ($\theta_t$ and $A_t$)=(0, 1) represented by Corr1. In the next iteration, variables ($\partial\theta_t$, 1) are applied, represented by Corr2, and so on, until a desired threshold correlation or maximum correlation is achieved between the in-phase path and the quadrature path, as indicated by the Beat-I and Beat-Q signals, explained in more detail below. While a snake method is provided, it will be understood that the present teachings are not limited thereto. Other techniques can be used as well.

Referring back to FIG. 2, at block 242, the initial quadrature calibration variables ($\theta_t$, $A_t$) of the table 300 are used to initiate calibration. As explained above, the initial correlation variables may be set to, for example, (0, 1). These variables 252 are applied to the dual output FMCW signal generator 102 to receive feedback from the feedback loop of the system of FIG. 2.

At block 244, the Beat-I and Beat-Q output received from the dual channel ADC 130 is used to perform a correlation of these two outputs (i.e., correlation between the two beating signals Beat-I and Beat-Q). Expression 10 below provides an example correlation:

$$M(\theta_t, A_t)=\text{MAC}(\text{Beat-I, Beat-Q})/L \quad \text{(Eq. 10)}$$

Where L is the length of the common correlation vector of Beat-I and Beat-Q

One correlation is performed for each frequency ramp used to frequency modulate (FM) the FMCW radar system. In one example, a DDS function of a Digital Ramp generator (DRG) is used. The ramp generation parameters allow the user to control both the rising and falling slopes of the ramp. The upper and lower boundaries of the ramp, the step size and step rate of the rising portion of the ramp, and the step size and step rate of the falling portion of the ramp, can be all programmable. Calibration is based on the similarity between Beat-I and Beat-Q signals from the dual channel DAC 130, identified by the multiply and accumulate operation (MAC) between the "beat signals" Beat-I and Beat-Q, performed by the quadrature calibration module 142.

At block 246, a comparison is performed and a determination is made whether the correlation is within a predetermined threshold. Equations 11 and 12 below provide example expressions:

$$\text{If } M(\theta_{max}, A_{max}) < M(\theta_t, A_t) \quad \text{(Eq. 11)}$$

$$\theta_{max}, A_{max} = \theta_t, A_t \quad \text{(Eq. 12)}$$

For example, the above operations are used to align and verify that the image rejection is optimal or within a predetermined threshold. To that end, the received radar responses in I & Q paths, represented by the Beat-I and Beat-Q signals provided by the dual channel ADC 130 are compared. For example, if the goal is to maximize the similarity between these to beat signals, the correlation between the Beat-I and Beat-Q signals is measured. A linear swift of the relative phase between the transmitted signals may be provided, starting with a classical 90 degrees.

If a threshold correlation is not achieved (i.e., "No" at decision block decision block 248, the process returns to block 242 and a next phase and amplitude calibration variable pair is used (e.g., from the reference table 300 of FIG. 3) and the iterative process continues. For example, an additional iteration is performed with introduction of amplitude variation and/or phase variation between the signals.

However, if the correlation is within the predetermined threshold (which could be maximum), then the appropriate quadrature calibration variable ($\theta_t$, $A_t$) pair is adopted as the appropriate (e.g., maximum) variables to be applied 250 as the selected variables 252. In various embodiments, this quadrature calibration can be applied to the in-phase path or the quadrature path. Accordingly, the dual channel programmable signal generator 102 is used to generate two signals in quadrature, where one path is adjusted with the respect to the other. Calibration is based on the similarity between Beat-I and Beat-Q. In this way, a more accurate correlation between these two paths is provided.

It should be noted that, for calibration purposes, the naturally occurring leakage 210 between the TX 110 and the RX 112 can be enhanced by way of beam steering in scenarios where the environment is not conducive to measure reflections. In case that the radar response is weak, (e.g., radar is facing the sky), the phases in RX 112 and TX 110 can be set to increase cross-talk, by creating an antenna-based loop that would produce strong radar response. For example, in one embodiment, the beam direction of the TX 110 and/or RX 112 can be adjusted (e.g., TX to transmit down (i.e., towards the direction of the RX) and/or the receiver RX is adjusted to sense up (e.g., in the direction of the TX)) to expound the leakage current in order to be able to evaluate the calibration capability of the system 200.

Figure 4:
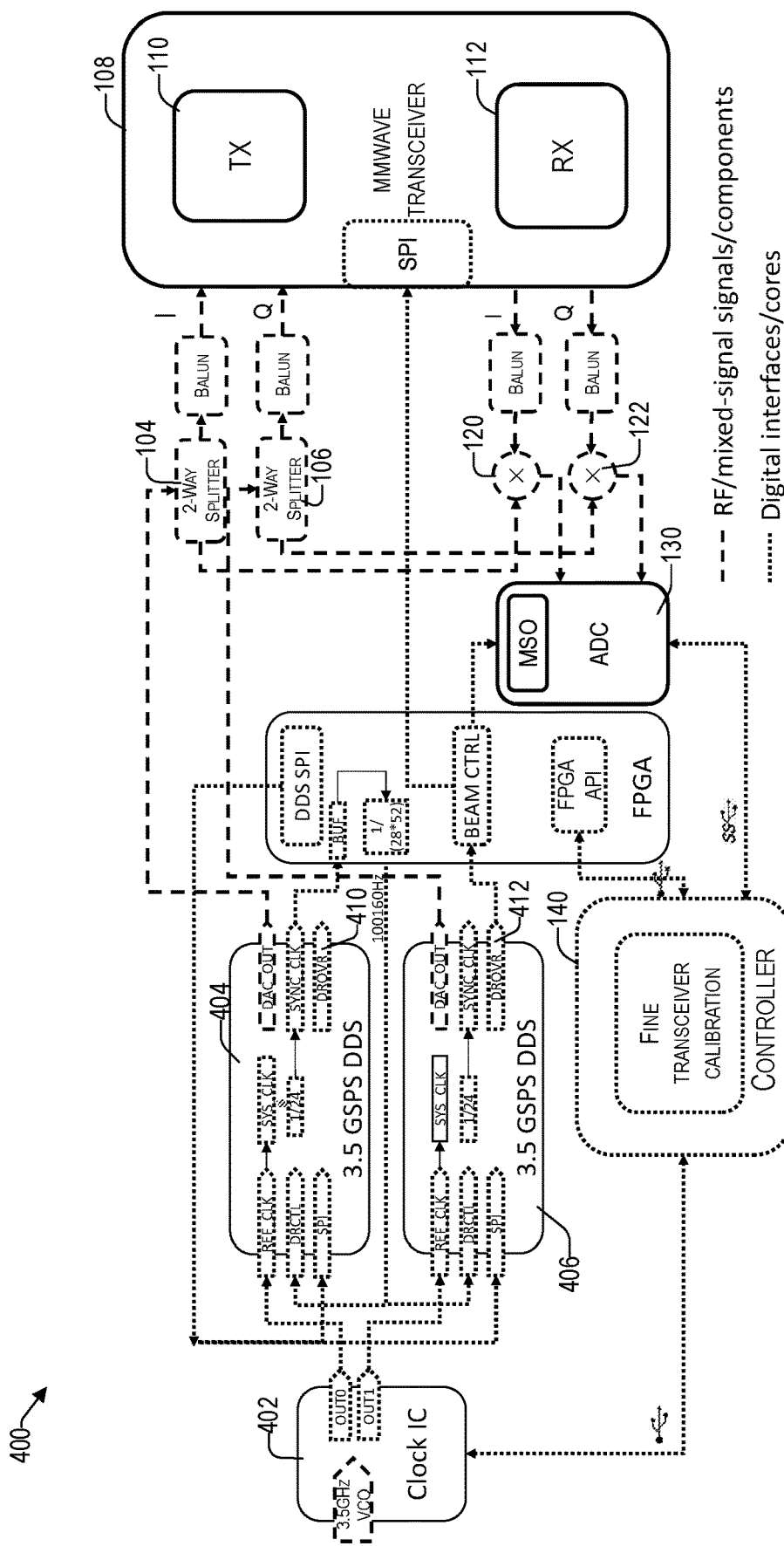
FIG. 4 provides a more detailed block diagram of an architecture of a calibration of an in-phase and quadrature path imbalance for a frequency modulated continuous-wave radar system using a quadrature transceiver, consistent with an illustrative embodiment.

Reference now is made to FIG. 4, which provides a more detailed block diagram 400 of an architecture of a calibration of an in-phase and quadrature path imbalance for a frequency modulated continuous-wave radar system using a quadrature transceiver, consistent with an illustrative embodiment. Many of the components in FIG. 4 are similar to those of FIG. 1 and therefore not repeated for brevity. In the embodiment of FIG. 4, the architecture indicates how the use of two single-output DDSs can be accommodated.

In the initialization, both direct digital synthesizers (DDSs) are being programmed with identical ramp parameters, such as ramp rate, step size, and bandwidth. The salient parameter that is different from the embodiment of FIG. 1 is that the one connected to in-phase is generating a cosine and the one connected to quadrature is generating a sine.

As illustrated in FIG. 4, a Clock Distribution integrated circuit (IC) 402 provides a reference clock to both DDSs 404 and 406, avoiding the use of internal phased locked loop (PLL). Two separate DDS (i.e., 404 and 406) are used in the architecture of FIG. 4. In the embodiment of FIG. 4, a divided clock of the DDS system clock is to generate a synchronized control of the digital ramp for both DDSs 404 and 406.

The DDS is providing an output signal of when the ramp starts and ends (DROVR) at 410 and 412, respectively. In case that the received signal is not strong enough, the controller steers the TX 110 and RX 112 towards each other.

The ADC 130 receives the output of the mixers 120, 122, and has a digital input for the ramp indicator signal that is synchronized with the two analog inputs. The controller 140 uses the ramp indicator signal to crop both analog inputs for further calculation of correlation values.

By virtue of the teachings herein, better image rejection is achieved between the TX 110 and the RX 112. In one aspect, verification of actual image rejection on low frequency signals is already available in the beating signals Beat-I and Beat-Q, without the need to use a manual spectrum analyzer or a dedicated circuit at high frequency. In one embodiment, the system of FIG. 2 provides continuous tracking of the quality of received signals by way of the feedback provided by the Beat-I and Beat-Q signals that are evaluated by the quadrature calibration block 142.

Example Results

Figure 5B:
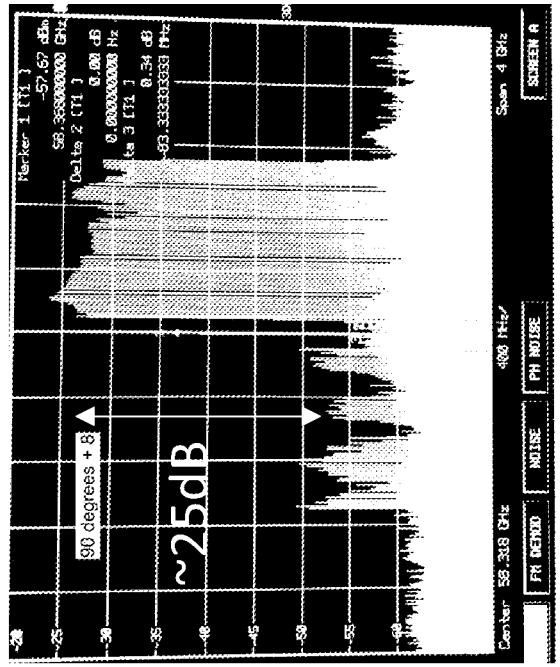
FIG. 5B illustrates an example spectrum response of the output of a quadrature transmitter TX after calibration.
Figure 5A:
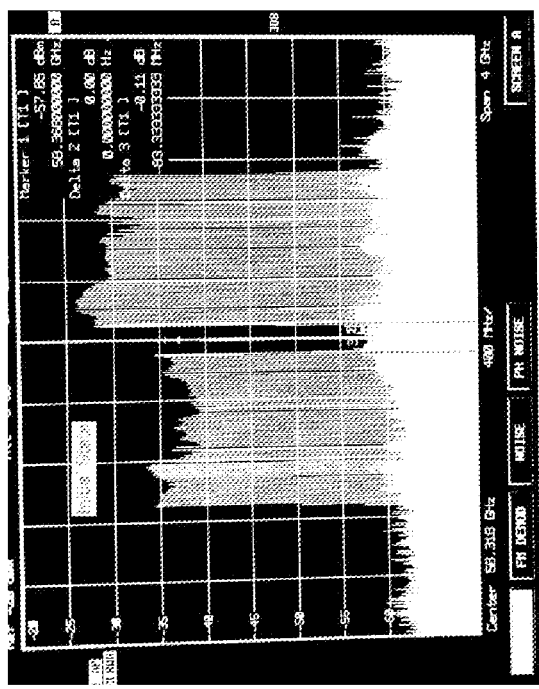
FIG. 5A illustrates an example spectrum response of the output of a quadrature transmitter TX before calibration.

Reference now is made to FIGS. 5A and 5B, which illustrate the spectrum response of the output of a quadrature receiver RX before and after calibration, respectively. As illustrated in FIG. 5A, the initial I and Q are set to cosine and sine accordingly before system calibration and the TX image therefor is not suppressed. By way of contrast, FIG. 5B illustrates a system level calibrated with right amplitude and phase compensation for I and Q outputs being the same based on the teachings herein, thereby resulting in an approximate 25 dB TX image suppression.

Example Process

Figure 6:
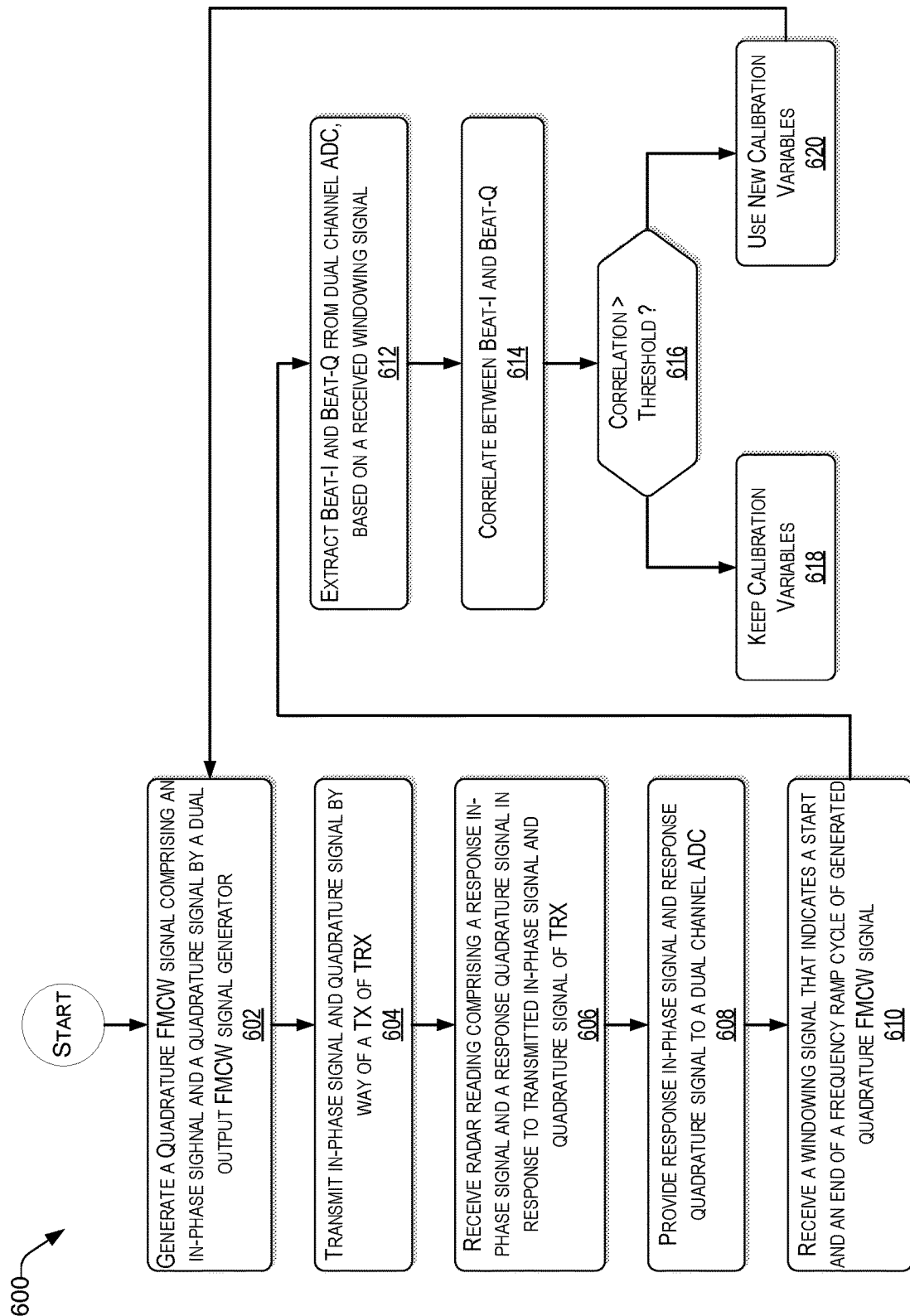
FIG. 6 presents an example processes, consistent with an illustrative embodiment.

With the foregoing overview of the example architectures 100, 200, and 400, it may be helpful now to consider a high-level discussion of an example process. To that end, FIG. 6 presents a process 600 of a method of automatic image rejection of a frequency modulated continuous-wave radar system, consistent with an illustrative embodiment. Process 600 is illustrated as a collection of blocks in a logical flowchart, which represents sequence of operations that can be implemented in hardware, software, or a combination thereof. In the context of software, the blocks represent computer-executable instructions that, when executed by one or more processors of a controller, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 600 is described with reference to the architecture 100 of FIG. 1.

At block 602, a quadrature FMCW signal comprising an in-phase signal and a quadrature signal is generated by a dual output FMCW signal generator 102.

At block 604, the in-phase signal and the quadrature signal are transmitted by way of a transmitter TX 110 of a transceiver 108.

At block 606, a radar reading comprising a response in-phase signal and a response quadrature signal is received in response to the transmitted in-phase signal and the quadrature signal of the transceiver 108.

At block 608, the response in-phase signal and the response quadrature signal are provided to a dual channel analog to digital converter (ADC) 130.

At block 610, the controller 140 receives a windowing signal that indicates a start and an end of a frequency ramp cycle of the generated quadrature FMCW signal.

At block 612, the controller 140 extracts an in-phase beat signal (Beat-I) and a quadrature beat signal (Beat-Q) from the dual channel ADC 130, based on a received windowing signal 140.

At block 614, the controller 140 correlates between the Beat-I and the Beat-Q.

At block 616, a determination is made whether the correlation is above a predetermined threshold. If so (i.e., "YES" at determination block 616), the controller continues with block 618 where the controller sets a relative phase and/or amplitude adjustment by providing a phase calibration variable ($\theta_t$) and/or an amplitude calibration variable ($A_t$) as input to the dual output FMCW signal generator, based on the correlation.

If not, (i.e., "NO" at determination block 616), the process continues with block 620, where the controller determines a new relative phase and/or amplitude adjustment by providing a new phase calibration variable ($\theta_t$) and/or a new amplitude calibration variable ($A_t$) as input to the dual output FMCW signal generator. The iterative process then returns to block 602 and continues until the correlation is above a predetermined threshold.

Example Computer Platform

Figure 7:
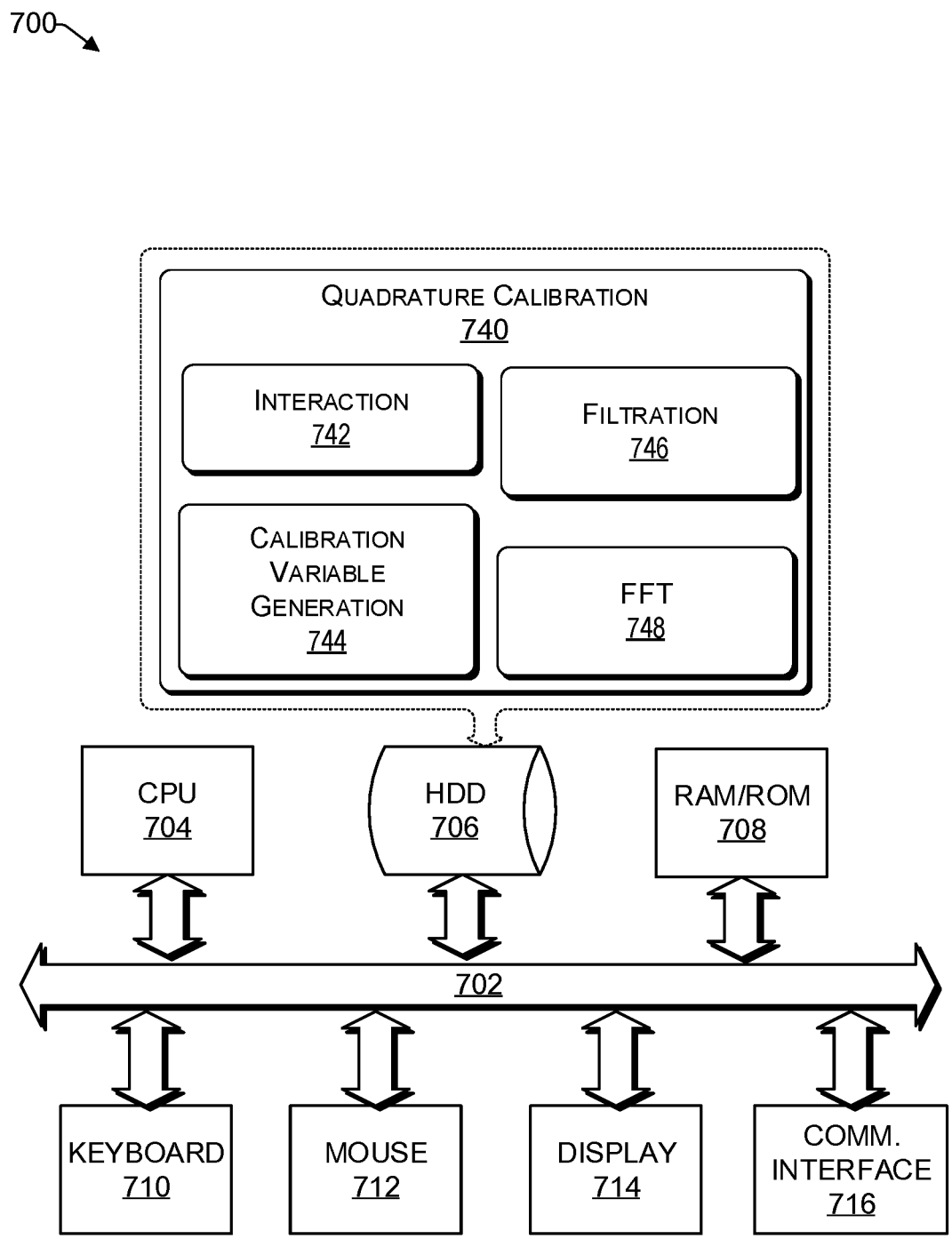
FIG. 7 provides a functional block diagram illustration of a computer hardware platform that can be used to implement a particularly configured computing device.

As discussed above, functions relating to automatic image rejection of a frequency modulated continuous-wave radar system, as shown in FIGS. 1, 2, and 4, and in accordance with process 600 FIG. 6, may involve a controller or processor. In this regard, FIG. 7 provides a functional block diagram illustration of a computer hardware platform 700 that can be used to implement a particularly configured computing device that could implement the controller of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the quadrature calibration engine 740, in a manner described herein. The quadrature calibration engine 740 may have various modules configured to perform different functions, such those discussed in the context of FIG. 1 and others. For example, there may be an interaction module 742 operative to interact with a dual channel ADC to extract an in-phase and/or quadrature beat therefrom. There may be a calibration variable generation module 744 configured to generate an appropriate quadrature calibration variable $\theta_t$ and/or $A_t$ to be used as an input to a dual output FMCW signal generator. In various embodiments, the quadrature calibration variables $\theta_t$ and/or $A_t$ can be calculated and/or retrieved from a reference table by way of following a snake pattern, as described herein.

In one embodiment, there is a digital filtration module operative to low pass filter out the signals received from the dual channel ADC. There may be an FFT module 748 operative to provide a radar output based on a received quadrature beat signal from the dual channel ADC.

While modules 742 to 748 are illustrated in FIG. 7 to be part of the HDD 706, in some embodiments, one or more of these modules may be implemented in the hardware of the computing device 700. For example, the modules discussed herein may be implemented in the form of partial hardware and partial software. That is, one or more of the components of the Quadrature calibration engine 740 shown in FIG. 7 may be implemented in the form of electronic circuits with transistor(s), diode(s), capacitor(s), resistor(s), inductor(s), varactor(s) and/or memristor(s). In other words, Quadrature calibration engine 740 may be implemented with one or more specially-designed electronic circuits performing specific tasks and functions described herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another state (e.g., voltage, current, charge, time, etc.,), or converted to another state (e.g., from HIGH to LOW and LOW to HIGH) without materially changing the underlying control method.

Aspects of the present disclosure are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A frequency modulated continuous-wave (FMCW) radar system comprising:
    a quadrature transceiver comprising:
        a transmitter having an in-phase input and a quadrature input; and
        a receiver having an in-phase output and a quadrature output;
    a dual channel FMCW signal generator having two direct digital synthesizers (DDSs), comprising:
        a first output coupled to the in-phase input of the transmitter; and
        a second output coupled to the quadrature input of the transmitter;
    a first splitter coupled between the first output of the dual channel FMCW signal generator and the in-phase input of the transmitter;
    a second splitter coupled between the second output of the dual channel FMCW signal generator and the quadrature input of the transmitter;
    a first mixer comprising:
        a first input coupled to a second output of the first splitter;
        a second input coupled to the in-phase output of the receiver; and
        an output of the first mixer;
    a second mixer comprising:
        a first input coupled to a second output of the second splitter;
        a second input coupled to the quadrature output of the receiver; and
        an output of the second mixer;
    a dual channel analog to digital converter (ADC) comprising:
        a first input coupled to the output of the first mixer; and
        a second input coupled to the output of the second mixer; and
    a controller coupled between the dual channel FMCW signal generator and the dual channel ADC.

2. The FMCW radar system of claim 1, wherein the dual channel FMCW signal generator is programmable.

3. The FMCW radar system of claim 1, wherein the dual channel FMCW is configured to provide a windowing signal that indicates a start and an end of each frequency ramp cycle.

4. The FMCW radar system of claim 1, wherein the controller comprises a quadrature calibration block that is configured to receive an in-phase beat signal from a first output of the dual channel ADC and a quadrature beat signal from a second output of the dual channel ADC.

5. The FMCW radar system of claim 4, further comprising a low pass filter at each input channel of the dual channel ADC.

6. The FMCW radar system of claim 4, wherein the controller further comprises a Fast Fourier Transform (FFT) block configured to receive the in-phase beat signal and the quadrature beat signal from the second output of the dual channel ADC and to provide a radar output having an improved signal to noise ratio (SNR).

7. The FMCW radar system of claim 4, wherein the quadrature calibration block is configured to provide at least one of a phase calibration variable ($\theta_t$) or an amplitude calibration variable ($A_t$) as input to the dual output FMCW signal generator.

8. The FMCW radar system of claim 1, wherein the dual channel FMCW signal generator is a digital circuit block.

9. The FMCW radar system of claim 1, wherein the controller is configured to:
    select initial quadrature calibration variables ($\theta_t$, $A_t$);
    apply the initial quadrature calibration variables ($\theta_t$, $A_t$) as input to the dual output FMCW signal generator;
    receive an in-phase beat signal from a first output of the dual channel ADC and a quadrature beat signal from a second output of the dual channel ADC based on the applied initial quadrature calibration variables ($\theta_t$, $A_t$);
    correlate the in-phase beat signal with the quadrature beat signal; and
    upon determining that the correlation is below a predetermined threshold, select new quadrature calibration variables ($\theta_t$, $A_t$).

10. A method of automatic image rejection of a frequency modulated continuous-wave (FMCW) radar system, comprising:
    generating a quadrature FMCW signal comprising an in-phase signal and a quadrature signal by a dual output FMCW signal generator;
    transmitting the in-phase signal and the quadrature signal by way of a transmitter of a transceiver;
    receiving a radar signal comprising a response in-phase signal and a response quadrature signal in response to the transmitted in-phase signal and the quadrature signal of the transceiver;
    providing the response in-phase signal and the response quadrature signal to a dual channel analog to digital converter (ADC);
    receiving, by a controller, a windowing signal that indicates a start and an end of a frequency ramp cycle of the generated quadrature FMCW signal;
    extracting, by the controller, an in-phase beat signal (Beat-I) and a quadrature beat signal (Beat-Q) from the dual channel ADC, based on the received windowing signal;
    correlating, by the controller, between the Beat-I and the Beat-Q; and
    generating, by the controller, a relative phase and/or amplitude adjustment by providing a phase calibration variable ($\theta_t$) and/or an amplitude calibration variable ($A_t$) as input to the dual output FMCW signal generator, based on the correlation.

11. The method of claim 10, further comprising upon determining that a threshold correlation is not achieved, iteratively adjusting the phase calibration variable ($\theta_t$) and/or the amplitude calibration variable ($A_t$) as input to the dual output FMCW signal generator, until the threshold correlation is achieved.

12. The method of claim 10, further comprising:
splitting the in-phase signal of the FMCW signal by a first power splitter into a first in-phase signal of the FMCW signal that is provided to the transmitter and a second in-phase signal of the FMCW signal as a first in-phase input to a first mixer; and
splitting the quadrature signal of the FMCW signal by a second power splitter into a first quadrature signal of the FMCW signal that is provided to the transmitter and a second quadrature signal of the FMCW signal as a first quadrature input to a second mixer.

13. The method of claim 12, further comprising:
mixing, by the first mixer, the first in-phase input with an in-phase radar signal received by the receiver and providing a result as a first input to the dual channel analog to digital converter (ADC); and
mixing, by the second mixer, the first quadrature input with a quadrature radar signal received by the receiver and providing a result as a second input to the dual channel ADC.

14. The method of claim 10, further comprising adjusting at least one of a direction of the transmitter or the receiver to increase a signal reflection to enhance a calibration capability of the FMCW radar system.

15. A method of calibrating a frequency modulated continuous-wave (FMCW) radar system comprising:
providing a quadrature transceiver comprising a transmitter having an in-phase input and a quadrature input, and a receiver having an in-phase output and a quadrature output;
providing a dual channel FMCW signal generator having two direct digital synthesizers (DDSs) and comprising a first output coupled to the in-phase input of the transmitter, and a second output coupled to the quadrature input of the transmitter;
coupling a first splitter between the first output of the dual channel FMCW signal generator and the in-phase input of the transmitter;
coupling a second splitter between the second output of the dual channel FMCW signal generator and the quadrature input of the transmitter;
providing a first mixer comprising a first input coupled to a second output of the first splitter, a second input coupled to the in-phase output of the receiver, and an output of the first mixer;
providing a second mixer comprising a first input coupled to a second output of the second splitter, a second input coupled to the quadrature output of the receiver and an output of the second mixer;
providing a dual channel analog to digital converter (ADC) comprising a first input coupled to the output of the first mixer, and a second input coupled to the output of the second mixer; and
coupling a controller between the dual channel FMCW signal generator and the dual channel ADC.

16. The method of claim 15, further comprising:
receiving, by the dual channel FMCW signal generator, a phase calibration variable ($\theta_t$) and/or an amplitude calibration variable ($A_t$); and
programming the dual channel FMCW signal generator based on the received phase calibration variable ($\theta_t$) and/or the amplitude calibration variable ($A_t$).

17. The method of claim 15, further comprising providing a windowing signal, by the dual channel FMCW signal generator, which indicates a start and an end of each frequency ramp cycle of the dual channel FMCW signal generator.

18. The method of claim 15, further comprising receiving, by a quadrature calibration block of the controller, an in-phase beat signal from a first output of the dual channel ADC and a quadrature beat signal from a second output of the dual channel ADC.

19. The method of claim 18, further comprising providing at least one of a phase calibration variable ($\theta_t$) or an amplitude calibration variable ($A_t$) as input to the dual output FMCW signal generator, by the quadrature calibration block of the controller.

20. The method of claim 15, further comprising:
selecting, by the controller, initial quadrature calibration variables ($\theta_t$, $A_t$);
applying, by the controller, the initial quadrature calibration variables ($\theta_t$, $A_t$) as input to the dual output FMCW signal generator;
receiving, by the controller, an in-phase beat signal from a first output of the dual channel ADC and a quadrature beat signal from a second output of the dual channel ADC based on the applied initial quadrature calibration variables ($\theta_t$, $A_t$);
correlating, by the controller, the in-phase beat signal with the quadrature beat signal; and
upon determining that the correlation is below a predetermined threshold, selecting, by the controller, new quadrature calibration variables ($\theta_t$, $A_t$) to be applied to the dual output FMCW signal generator.

* * * * *